UNITED STATES PATENT OFFICE.

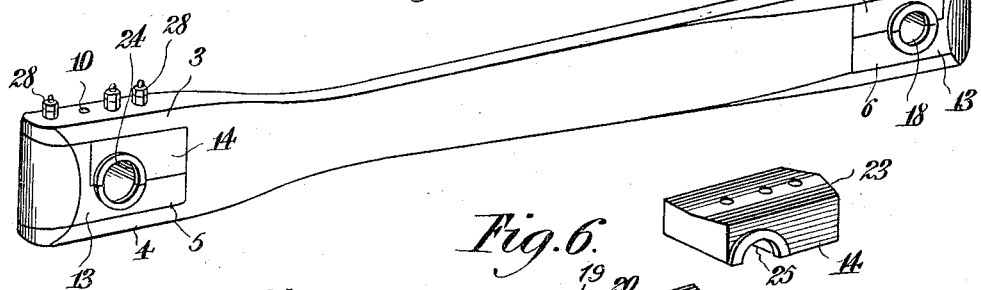

MURVIN NORRIS, OF COTTAGEVILLE, WEST VIRGINIA.

PITMAN-ROD.

1,193,814.  Specification of Letters Patent.  Patented Aug. 8, 1916.

Application filed February 7, 1914. Serial No. 817,263.

*To all whom it may concern:*

Be it known that I, MURVIN NORRIS, a citizen of the United States, residing at Cottageville, in the county of Jackson and State of West Virginia, have invented new and useful Improvements in Pitman-Rods, of which the following is a specification.

The present invention relates to improvements in pitman rods, and especially the boxes for such rods, and the invention resides in the construction, combination and operative arrangement of parts set forth in the following specification and falling within the scope of the appended claims.

In the drawings: Figure 1 is a perspective view of a pitman rod constructed in accordance with the present invention, Fig. 2 is a central vertical longitudinal sectional view taken through the ends of the rod, Fig. 3 is an enlarged horizontal sectional view on the line 3—3 of Fig. 2, Fig. 4 is a transverse sectional view on the line 4—4 of Fig. 2, Fig. 5 is a detail perspective view looking toward one end of the piston rod, the box being removed, and Fig. 6 is a perspective view of the box, the sections being separated.

Referring now to the drawings in detail, the numeral 1 designates a piston rod which may be of any desired or preferred construction, and which has its ends slotted or bifurcated to provide spaced longitudinally extending arms 3 and 4, between which are arranged the boxes 5 and 6. As the arrangement of both of the ends of the piston rods is similar, and as the construction of both of the boxes 5 and 6 are also similar, the description of one of the said ends and one of the boxes as well as the reference characters applied thereto may be understood as being equally applicable to the second end of the rod. The arms 4 are arranged upon the lower edge of the rod 1, and at spaced intervals are provided with substantially rectangular depressions 7, and the said arms are provided with openings 8 which communicate with and are arranged centrally of the said depressions, and the openings 8 register with similar openings 9 in the upper arms 3. The said upper arms are each provided with an additional opening 10 arranged intermediate of two of the openings 9, each of said openings 10 being adapted to receive the outer end of the lubricator (not shown). Both the arm 3 and the arm 4 have their inner faces concaved, the said concavities extending the entire length of the arms, and the transverse wall of the rod between the said arms 3 and 4 is inclined inwardly from its sides toward its center, so that the said wall, which is designated by the numeral 11, is substantially V-shaped, and concaved faces of the arms are indicated by the numerals 12.

The boxes 5 and 6 each comprise two members 13 and 14. The member 13 is of a greater length than the member 14, the former being of a length corresponding with the distance between the wall 11 and the ends of the arms 3 and 4, and the upper end of the said section 13 is convex or rounded, as at 15, to correspond with the inner face 12 of the arm 3, the rear end of said section 3 being inclined outwardly from its sides to its center to provide the same with a V-shaped end 16 which is adapted to be received within the depressed V-shaped wall 11. The outer end of the member 13 is of a width corresponding with the distance between the arms 3 and 4 providing the said member with what may be termed an offset head 13'. The longitudinal wall of the head 13' as well as the longitudinal lower wall of the member 13 are rounded or convexed to be snugly received by the inner concaved faces of the arms 3 and 4. The inner face of the head 13' is formed with a substantially V-shaped vertically extending depression 19, while the end of the body of said member 13 to the rear of its head is substantially V-shaped in cross section as indicated by the numeral 16, and the upper wall of said member 13 is round or convexed to be snugly received within the concaved portion 12 on the arm 3. The member or section 14 is of a size sufficient to be snugly received upon the body of the member or section 13 and has its upper face round to engage with the inner concaved face of the arm 3 and both of its opposite ends round or convexed, one of the ends designated by 23 to be received within the concaved portion 11 between the arms 3 and 4 and the second to be received within the convexed portion 19 of the head 13'. The members 13 and 14 at a suitable distance from the juncture of the head 13' of the member 13 are provided with transverse semi-cylindrical openings which register and each of the said openings are adapted to receive a semi-cylindrical boss or bearing plate, that provided upon the section 13 being indicated by the numeral 18, and that arranged within the transverse opening of the member 14 being indicated by the numeral 25. The sections 13 and 14 are provided with openings which are adapted to register with the openings in the arms, and the section 13 is provided with an additional opening which communicates with its transverse semi-cylindrical depression, whereby the lubricant from the lubricant box may be fed to the wrist pin, (which passes through the bosses 18 and 25) the remaining registering openings receiving the shanks of bolts 26, the heads of the said bolts being arranged in the depressions 7 in the underside of the arm 4, while nuts 28 are arranged upon the projecting portions of the bolts which extend above the arm 3.

With such an arrangement, it will be noted that the nuts of the bolts are at all times clearly in view of the engineer, and the heads of the same being arranged within the depressions provide for the adjustment of the nuts without the necessity of the employment of means for holding both the heads of the bolts and for rotating the nuts upon the bolts. The inner wall provided by the depending portion of the outer end of the section 13 is concaved longitudinally, while the outer end of the section 14 is convex and adapted to be received within the said mentioned concavity when the sections of the block are assembled.

From the above description, taken in connection with the accompanying drawings, the simplicity of the device as well as the advantages thereof will, it is thought, be perfectly apparent to those skilled in the art to which such invention appertains without further detailed description.

Having thus described the invention, what I claim is:

In a device of the character described, in combination, a pitman having a bifurcated portion, a pair of blocks snugly arranged between the parts of said bifurcated portion, one of said blocks being formed with a transverse substantially semi-cylindrical opening, and having a substantially U-shaped flange extending outwardly of each end of said semi-cylindrical opening and formed at right angles to its length, said flanges having semi-cylindrical pin receiving edges spaced above the surface of said opening, the other section being provided with a complemental semi-cylindrical opening and with outstanding U-shaped flanges similarly shaped and disposed relative to said latter opening as herein before set forth of the first named flanges, the flanges of the two sections contacting whereby to provide a pin receiving opening and whereby to form an oil collecting reservoir, one of said sections being formed together with said bifurcated portion with an oil feeding port leading to said semi-cylindrical openings.

In testimony whereof I affix my signature in presence of two witnesses.

MURVIN NORRIS.

Witnesses:
JOHN L. LEONARD,
D. M. RHODES.

Copies of this patent may be obtained for five cents each, by addressing the "Commissioner of Patents, Washington, D. C."